(12) United States Patent
Ikeyama et al.

(10) Patent No.: US 10,414,093 B2
(45) Date of Patent: Sep. 17, 2019

(54) THREE-DIMENSIONAL MOLDING DEVICE AND THREE-DIMENSIONAL MOLDING METHOD

(71) Applicant: TOYOTA JIDOSHA KABUSHIKI KAISHA, Toyota-shi (JP)

(72) Inventors: Koichi Ikeyama, Miyoshi (JP); Naoya Era, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 232 days.

(21) Appl. No.: 15/671,752

(22) Filed: Aug. 8, 2017

(65) Prior Publication Data
US 2018/0043616 A1    Feb. 15, 2018

(30) Foreign Application Priority Data

Aug. 10, 2016  (JP) .................................. 2016-157955

(51) Int. Cl.
| | |
|---|---|
| *B29C 64/165* | (2017.01) |
| *B29C 64/205* | (2017.01) |
| *B29C 64/255* | (2017.01) |
| *B33Y 10/00* | (2015.01) |
| *B33Y 30/00* | (2015.01) |
| *B29C 64/153* | (2017.01) |
| *B29C 64/214* | (2017.01) |
| *B33Y 50/02* | (2015.01) |
| *B29C 64/393* | (2017.01) |

(52) U.S. Cl.
CPC .......... *B29C 64/214* (2017.08); *B29C 64/153* (2017.08); *B29C 64/165* (2017.08); *B29C 64/205* (2017.08); *B29C 64/255* (2017.08); *B29C 64/393* (2017.08); *B33Y 10/00* (2014.12); *B33Y 30/00* (2014.12); *B33Y 50/02* (2014.12)

(58) Field of Classification Search
None
See application file for complete search history.

(56) References Cited

U.S. PATENT DOCUMENTS

| | | | |
|---|---|---|---|
| 9,242,413 B2 * | 1/2016 | Hartmann | ............. B22F 3/1055 |
| 2011/0278773 A1 | 11/2011 | Bokodi et al. | |
| 2015/0328836 A1 | 11/2015 | Okazaki | |

(Continued)

FOREIGN PATENT DOCUMENTS

| | | |
|---|---|---|
| JP | 2011-251529 A | 12/2011 |
| JP | 2015-217562 | 12/2015 |
| WO | WO 2015/151832 A1 | 10/2015 |

*Primary Examiner* — Mary Lynn F Theisen
(74) *Attorney, Agent, or Firm* — Oblon, McClelland, Maier & Neustadt, L.L.P.

(57) ABSTRACT

The three-dimensional molding device includes a recoater configured to discharge a granular material from a discharge port onto the molding table such that the granular material is superimposed in layer, a solidification device configured to solidify a partial region of the granular material in a plane solidification device direction of an upper surface of the molding table, a moving mechanism configured to cause the recoater to reciprocate in a plane direction parallel to the upper surface of the molding table, and at least one plug member configured to close a part of an opening in at least one location in a longitudinal direction of the discharge port of the recoater and limit a discharge range of the granular material.

7 Claims, 9 Drawing Sheets

(56) References Cited

U.S. PATENT DOCUMENTS

2016/0311164 A1* 10/2016 Miyano .................... B05D 1/12
2017/0021564 A1    1/2017 Ooba et al.
2017/0066190 A1*  3/2017 Klein ..................... B33Y 10/00

* cited by examiner

THREE-DIMENSIONAL MOLDING DEVICE AND THREE-DIMENSIONAL MOLDING METHOD

INCORPORATION BY REFERENCE

The disclosure of Japanese Patent Application No. 2016-157955 filed on Aug. 10, 2016 including the specification, drawings and abstract is incorporated herein by reference in its entirety.

BACKGROUND

1. Technical Field

The disclosure relates to a three-dimensional molding device and a three-dimensional molding method, which form a molded object by laminating and solidifying a granular material.

2. Description of Related Art

In solid object molding in recent years, by giving a three-dimensional object a structure where layered laminations are stacked, a three-dimensional molding device has been spreading, which performs a molding operation of such objects automatically. For example, WO 2015/151832 describes a three-dimensional molding device that repeats operations of spreading sand, which is a granular material, on a molding table, and solidifying and laminating the sand using a binder in a partial region corresponding to a solid-shaped transverse-sectional shape of a sand mold to be molded, thereby molding the desired sand mold (molded object) as a lamination.

SUMMARY

However, in this type of three-dimensional molding device, regardless of the size of a sand mold to be molded, in other words, regardless of the size of a transverse-sectional shape of a molded object, sand in the maximum area on the molding table is laminated.

Because of this, even when a molded object P, which is small with respect to a recoater 22, is molded as shown in FIG. 5A and FIG. 5B, an operation process using the above related art is performed for repeatedly discharging molding sand S from the recoater 22 and spreading the molding sand S within a range of the maximum area on the molding table 12. Therefore, after the molding operation, an operation is necessary to remove and collect a large amount of unnecessary molding sand Sd other than the molding sand Sp that structures the molded object P.

As stated above, even for a small molded object P, a large amount of molding sand S, which is enough for fabricating a large-sized molded object, is laminated and partially solidified and then a large amount of remaining molding sand Sd is collected. This causes a problem that a workload is large and it is time consuming.

Therefore, the disclosure provides a three-dimensional molding device that performs a molding operation by using an appropriate amount of granular material for the size of the molded object, thereby molding the molded object with an appropriate workload for the size of the molded object.

The first aspect of the disclosure relates to a three-dimensional molding device which forms a molded object by solidifying and laminating a partial region of a granular material that is superimposed in layer on an upper surface of a molding table. The first aspect of the disclosure includes a recoater configured to discharge the granular material from a discharge port having an elongated shape onto the upper surface of the molding table such that the granular material is superimposed in layer, a moving mechanism configured to cause the recoater to reciprocate in a plane direction parallel to the upper surface of the molding table, the recoater reciprocating in a direction intersecting a longitudinal direction of the discharge port, a solidification device configured to solidify a partial region of the granular material in a plane direction of the upper surface of the molding table, the granular material being superimposed in layer on the upper surface of molding table, and at least one plug member configured to close a part of an opening in at least one location in the longitudinal direction of the discharge port of the recoater and limit a discharge range of the granular material, the at least one plug member being removable from the recoater.

According to the aspect of the disclosure, by only setting the plug member that closes a part of the opening in at least one location of the discharge port of the recoater that discharges and laminates the granular material on the upper surface of the molding, it is possible to limit the discharge range of molding sand to an extent of the solidifying region of the granular material solidified by the solidification device. This means that, it is possible to limit discharge of the granular material into a range that does not prevent forming of the solidifying region of the granular material. In other words, the granular material is discharged and laminated in a range that covers a region corresponding to a transverse-sectional shape required for lamination and molding of the molded object, and the discharge of the granular material to other range is limited.

Therefore, it is possible to repeat a molding operation in which a necessary and sufficient amount of granular material is discharged, laminated, and solidified in a region corresponding to a transverse-sectional shape of the molded object (lamination), and it is possible to mold the molded object while avoiding unnecessary discharge of a large amount of granular material.

The first aspect further includes a solidified region setting part that sets a solidifying region in each layer of the granular material, and the solidified region setting part may set a solidifying region of the molded object and a solidifying region of a wall-shaped object, which is located outside the solidifying region of the molded object and stores the granular material laminated in a non-solidified state next to the molded object.

The first aspect further includes a movement control part configured to control the moving mechanism, and the movement control part may be configured to move the recoater such that the discharge port reciprocates within a range exceeding the solidifying region of the wall-shaped object by a predetermined distance.

In the first aspect, the recoater may be configured such that a plurality of types of the plug members having different lengths is attachable and detachable.

The second aspect of the disclosure relates to a three-dimensional molding method, by which the molded object is formed by using the three-dimensional molding device according to the first aspect. The second aspect of the disclosure includes forming a molded object solidified region, which serves as one of layers laminated to form the molded object, and a wall-shaped object solidified region, which serves as one of layers laminated to form the wall-shaped object, by using the solidification device, in the granular material that is formed into a layer with a constant thickness on the upper surface of the molding table, the wall-shaped object storing the granular material laminated in a non-solidified state next to and outside the molded object solidified region, and forming the molded object and the wall-shaped object by laminating the molded object solidified regions and the wall-shaped object solidified regions respectively, the wall-shaped object solidified regions and the molded object solidified regions are laminated simultaneously.

In the second aspect, the at least one plug member may be set on the discharge port side of the recoater, the at least one plug member configured to suppress the granular material from being discharged to the outside of the wall-shaped object solidified region, on the inner side of which the molded object solidified region is positioned.

In the second aspect, the recoater may be moved such that discharge port of the recoater reciprocates within a range from the molded object solidified region to a point exceeding the wall-shaped object solidified region by a predetermined distance.

The disclosure is able to provide the three-dimensional molding device by which a molding operation is realized using an amount of the granular material in accordance with the size of the molded object, thereby reducing a workload in accordance with the size of the molded object and molding the molded object in a period of time in accordance with its size.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Herein below, embodiments of the disclosure are explained in detail with reference to the drawings. FIG. 1 to FIG. 6 are views of the first embodiment of a three-dimensional molding device of the disclosure.

Figure 1:
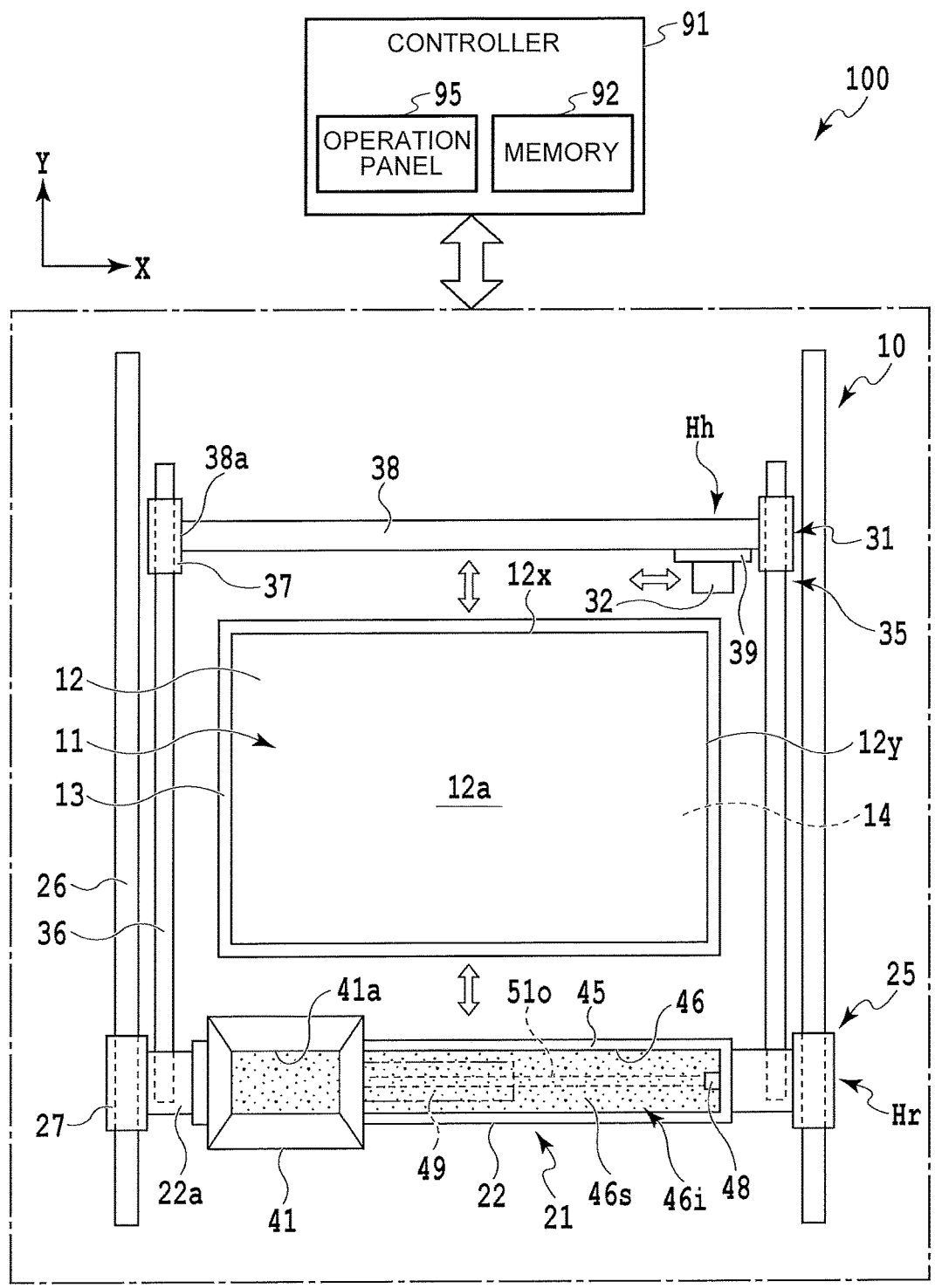
FIG. 1 is a view of the first embodiment of a three-dimensional molding device, and is a plan view of a schematic overall structure of the three-dimensional molding device.
Figure 2:
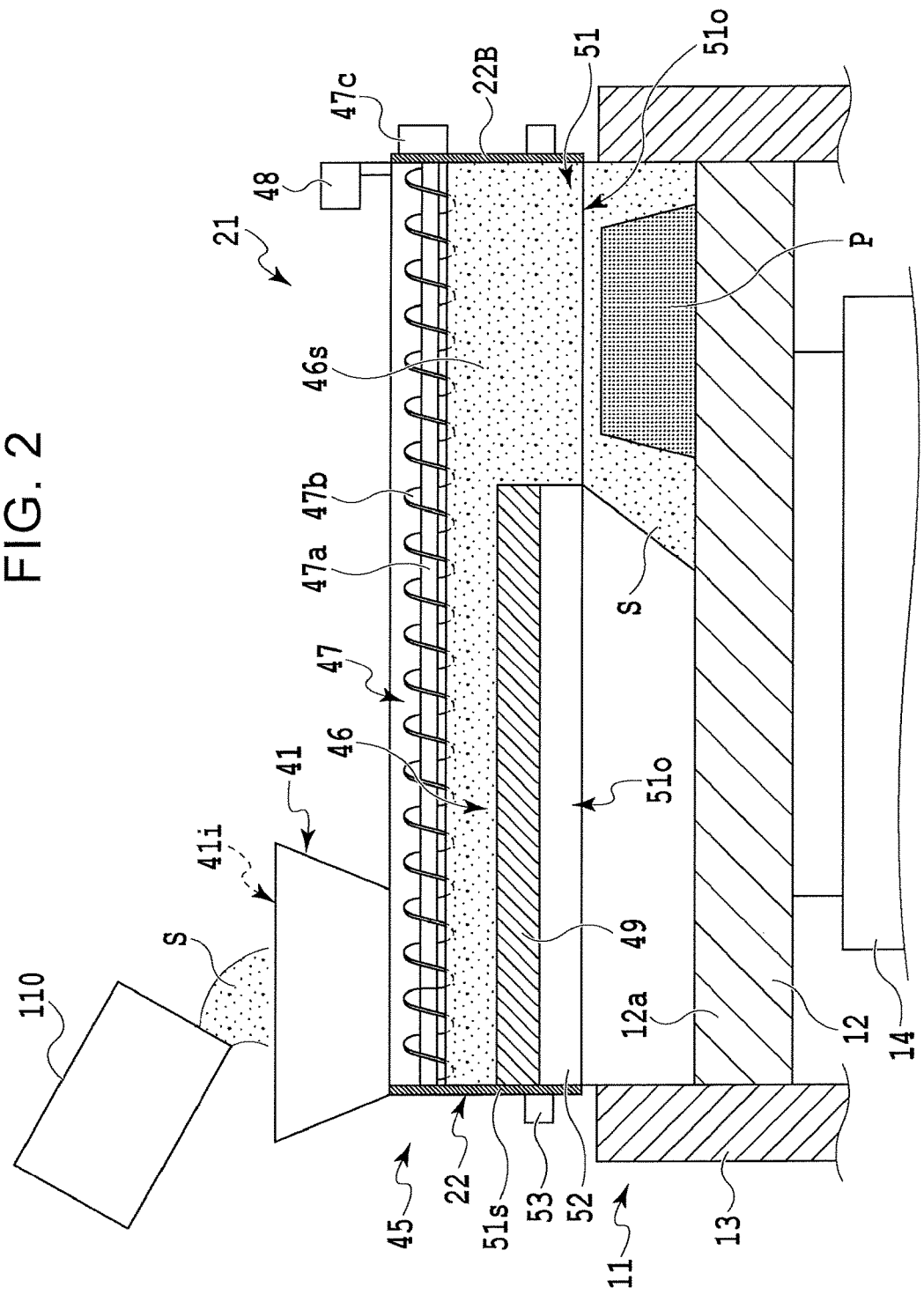
FIG. 2 is a schematic vertical sectional view explaining a structure of a recoater of the first embodiment.

In FIG. 1 and FIG. 2, a three-dimensional molding device 100 of the embodiment is constructed by including an elevating table device 11, a powder and grain material lamination device 21, a binder injection device 31, and a controller 91, and the controller 91 performs integrated control of each of the devices 11, 21, 31 of a drive system 10.

The three-dimensional molding device 100 repeats a molding process operation. In the molding process operation, the powder and grain material lamination device 21 discharges and laminates a powder and grain material, for example, molding sand S, onto an upper surface 12a of a molding table 12 of the elevating table device 11, thereby forming a discharged layer L, and, the binder injection device 31 injects a liquid binder to a partial region of the discharged layer L for bonding and solidification. Thus, a part of the discharged layer L of the molding sand S, which is discharged onto the upper surface 12a of the molding table 12, is laminated and solidified, and then molded into a desired solid-shaped molded object P.

Here, the three-dimensional molding device 100 of the embodiment uses, for example, the molding sand S coated with specific resin, and injects a binder, which reacts to the specific resin, towards the molding sand S so that the molding sand S is bonded and solidified together in a partial region of the discharged layer L laminated on the upper surface 12a of the molding table 12, thereby molding the molded object P. The bonding and solidifying method is not limited to the one using the binder according to the embodiment, and, other methods are applicable to a molding method in which, for example, a partial region is bonded and solidified by heat or light before lamination, thereby forming a solid-shaped molded object P.

The molding sand S discharged and laminated by the powder and grain material lamination device 21 is obtained as a kneader 110 mixes, for example, a resin agent, a curing agent or the like, in addition to sand, kneads them to have a constant grain size and adjusts them to have desired fluidity. Thereafter, the molding sand S is put in a later-described feeding part 41 and then fed into a hopper 46. FIG. 2 shows a form where the molding sand S is put into the feeding part 41 directly from the kneader 110, but the disclosure is not limited to this. For example, the molding sand S adjusted by the kneader 110 may be put into the feeding part 41 by using a conveyer belt, a bucket or the like. In the embodiment, an example is explained in which the molding sand S coated with the specific resin is bonded and solidified by a binder, but the disclosure is not limited to this. For example, silica sand having a minute grain size may be used as molding sand, and joining paste for the silica sand may be injected as a binder to form the molded object P.

The elevating table device 11 is provided with the molding table 12, a frame member 13 housing the molding table 12, and an elevating device 14 (see FIG. 2) supporting the molding table 12. The molding table 12 has the flat upper surface 12a that is able to secure a rectangular-shaped molding region A having a large area surrounded by short sides 12y and long sides 12x so that a maximum outline of the molded object P in a plan view is located inside the molding table 12. The frame member 13 surrounds the molding table 12 so as not to prevent movement of the molding table 12 in an upper-lower direction, and is formed into a wall shape along the short sides 12y and long sides 2x of the molding table 12 so that the molding sand S of the discharged layer L laminated on the upper surface 12a does not leak out.

The elevating device 14 is installed inside the frame member 13 so as to support a lower part of the molding table 12. The elevating device 14 elevates and lowers the molding table 12 in the vertical direction while maintaining the upper surface 12a in a horizontal state in accordance with a control signal from the later-described controller 91. For example, in accordance with a control signal sent from the controller 91 during a molding control process, the elevating device 14 lowers the molding table 12 highly accurately by a single layer so that a layer thickness d (see FIG. 8) of a discharged layer L of newly discharged molding sand S becomes constant. In the embodiment, explanation is given about an example case where the molding sand S is laminated by lowering the molding table 12, but the disclosure is not limited to this. For example, the later-described powder and grain material lamination device 21 may be elevated to laminate the molding sand S. However, since the frame member 13 prevents movement of the powder and grain material lamination device 21, it is preferred that the molding table 12 is elevated and lowered as described in the embodiment.

The powder and grain material lamination device 21 is provided with a recoater 22 and a moving mechanism 25. The recoater 22 discharges and laminates the molding sand S from a discharge port 51o of a later-described discharge part 51, which is open towards the upper surface 12a of the molding table 12. The moving mechanism 25 moves the recoater 22 in a plane direction parallel to the upper surface 12a while supporting the recoater 22 so as to maintain a posture of the recoater 22 with respect to the molding table 12.

In the recoater 22, the discharge port 51o of the discharge part 51 extends in a direction parallel to the long side 12x of the molding table 12, and the recoater 22 is supported by the moving mechanism 25 in such a posture that a distance of separation between the discharge port 51o of the recoater 22 and the upper surface 12a of the molding table 12 becomes constant. The recoater 22 is reciprocated by the moving mechanism 25 in a direction parallel to the short sides 12y of the molding table 12, which is orthogonal to (intersects at right angles with) the longitudinal direction of the discharge port 51o of the discharge part 51.

The moving mechanism 25 is provided with a pair of recoater-Y-axis-rails 26, which is arranged on both outer sides of the short sides 12y of the molding table 12 and extends in a parallel direction, and a pair of recoater-Y-axis-sliders 27, which is arranged on the recoater-Y-axis-rails 26 in a movable manner while supporting both end parts 22a of the recoater 22. In the moving mechanism 25, the recoater-Y-axis-sliders 27 run in forward and reverse directions on the recoater-Y-axis-rails 26 in accordance with a control signal from the later-described controller 91.

Because of this, the recoater 22 of the powder and grain material lamination device 21 is reciprocated by the moving mechanism 25 in a direction parallel to the short sides 12y while remaining in a state where the recoater 22 crosses over the long sides 12x of the molding table 12. Then, the recoater 22 is able to allow the molding sand S to be discharged from the discharge port 51o onto the upper surface 12a of the molding table 12, thereby laminating the molding sand S in the molding region A with a constant layer thickness d.

The binder injection device 31 is provided with an injection head 32 and a moving mechanism 35. The injection head 32 injects a binder for the molding sand S from a plurality of injection holes (not shown) formed so as to face the upper surface 12a of the molding table 12. The moving mechanism 35 supports and moves the injection head 32 while maintaining the posture of the injection head 32 with respect to the molding table 12.

The injection head 32 injects the binder for the molding sand S from the injection holes. The binder is supplied from a tank (not shown). The injection head 32 is supported by the moving mechanism 35 in such a posture that a distance of separation between the injection holes and the upper surface 12a of the molding table 12 becomes constant. Also, while remaining in that posture, the injection head 32 is moved by the moving mechanism 35 in an X-axis direction parallel to the long sides 12x of the molding table 12 and in a Y-axis direction parallel to the short sides 12y of the molding table 12.

The moving mechanism 35 is provided with a pair of head-Y-axis-rails 36, which is positioned in an inner side of the pair of recoater-Y-axis-rails 26 of the moving mechanism 25 on both outer sides of the short sides 12y of the molding table 12, a pair of head-Y-axis-sliders 37, which is arranged on the head-Y-axis-rails 36 in a movable manner while supporting the injection head 32 through a head-X-axis-rail 38 and a head-X-axis-slider 39 described later, the head-X-axis-rail 38 whose both end parts 38a are connected with and supported by the head-Y-axis-sliders 37, and the head-X-axis-slider 39 arranged in the head-X-axis-rail 38 in a movable manner while supporting the injection head 32. In the moving mechanism 35, the sliders 37, 39 run in forward and reverse directions on the rails 36, 38, respectively, in accordance with a control signal from the later-described controller 91.

Because of this, the injection head 32 of the binder injection device 31 is reciprocated by the moving mechanism 35 up to positions beyond the long sides 12x and the short sides 12y of the molding table 12 in the directions parallel to the long sides 12x and the short sides 12y, respectively. Then, the injection head 32 injects a constant amount of the binder from the injection holes to a partial region of the molding region A spreading in the plane direction on the upper surface 12a of the molding table 12, thereby bonding and solidifying the laminated molding sand S having the layer thickness d. This means that the binder injection device 31 structures a solidification device.

Then, the recoater 22 of the powder and grain material lamination device 21 is constructed by including the feeding part 41, a storage part 45, and the discharge part 51.

The feeding part 41 is arranged on one side of the recoater 22 in a length direction, and a feeding port 41i communicating with inside of the later-described hopper 46 of the storage part 45 is open upwardly. In the feeding part 41, the molding sand S adjusted by the kneader 110 is put from the feeding port 41i, and supplied into the storage part 45 (hopper 46).

The storage part 45 is provided with the hopper 46, a feeder 47, and a residual quantity sensor 48.

The hopper 46 is formed in an upper side of a body member 22B of the recoater 22, which has a block shape with an equal length to the long sides 12x of the molding table 12. In the hopper 46, a long opening 46i is open upwardly, which has an equal length to the long sides 12x of the molding table 12 and is narrow in the direction of the short sides 12y.

Figure 3:
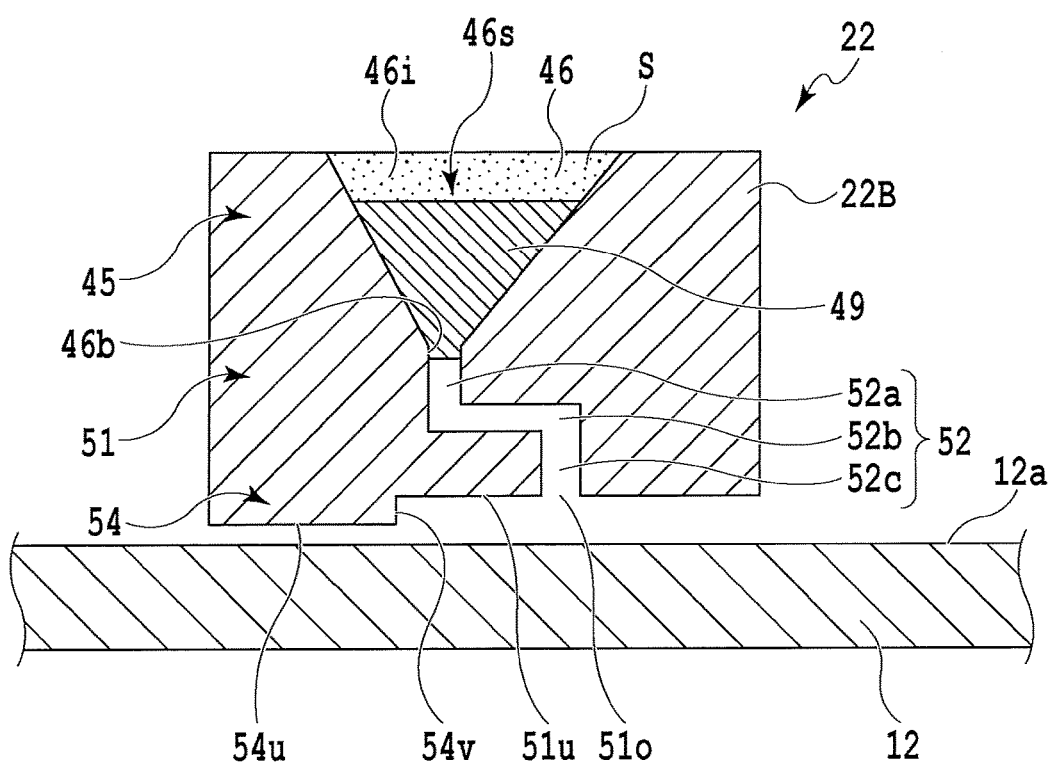
FIG. 3 is a view of a discharge structure of the recoater of the first embodiment, and a vertical sectional view of a state where a plug member is set.

As shown in FIG. 3, the hopper 46 has a housing space 46s that continues downwardly from the opening 46i, and houses the molding sand S inside the housing space 46s. The housing space 46s of the hopper 46 is formed into an inverted triangle so that a vertical sectional shape parallel to the short sides 12y of the molding table 12 becomes narrower towards its center in the direction of the short sides 12y, and a flow-out ditch 46b for the molding sand S is formed in the lowest position of the inverted triangle.

The feeder 47 is provided with a shaft 47a and a spiral plate 47b, and configured as a screw-type conveyer (also referred to as an auger device) structure arranged so as to lie inside the housing space 46s of the hopper 46. A bearing (not shown) supports the shaft 47a of the feeder 47 so that the shaft 47a extends in the length direction of the hopper 46 and rotates inside the housing space 46s, and the shaft 47a is rotated by a motor 47c attached to one end side. Also, the spiral plate 47b of the feeder 47 is formed into a shape that spirally revolves around the shaft 47a and fixed.

The residual quantity sensor 48 is arranged in an upper part of the hopper 46 on the other side away from the feeding port 41i. The residual quantity sensor 48 detects a height of an upper surface position of the molding sand S as a stored amount of the molding sand S accumulated inside the hopper 46. The residual quantity sensor 48 is connected with the later-described controller 91 so as to be able to send out a detection signal.

Because of this, in the feeder 47 of the storage part 45, in accordance with a control signal from the later-described controller 91 based on a sensor signal (detection information) of the residual quantity sensor 48, the motor 47c is driven forward and reversely, thus rotating the spiral plate 47b around the shaft 47a. Then, in the feeder 47, the rotating spiral plate 47b is able to transfer the molding sand S stored inside the housing space 46s of the hopper 46 in an extruding fashion in accordance with a direction of the rotation, and is thus able to level the molding sand S put from the feeding port 41i so that the molding sand S becomes generally equal in the longitudinal direction of the hopper 46.

The discharge part 51 is provided with a discharge passage 52, vibrators 53, and a leveling part 54.

As shown in FIG. 3, the discharge passage 52 is formed in a lower part of the body member 22B of the recoater 22. The discharge passage 52 is positioned in a lower part of the hopper 46 of the storage part 45 and formed so as to continue from the flow-out ditch 46b.

The discharge passage 52 is formed so as to have an equal length (width) to that of the housing space 46s of the hopper 46 in a direction of the long sides 12x of the molding table 12, and is fabricated into a shape continuous to the discharge port 51o of the long-shaped discharge part 51, which is open in a lower part of the recoater 22. In other words, since the discharge passage 52, which is formed to have the equal length (width) to that of the hopper 46 of the storage part 45, is continuous from the hopper 46, the discharge part 51 is structured so that the molding sand S stored inside the hopper 46 can be discharged from the discharge port 51o with the equal width to that of the long sides 12x on the upper surface 12a of the molding table 12, thereby forming the discharged layer L.

The discharge passage 52 is formed to include a first falling passage 52a, which is continuous from the flow-out ditch 46b at the lowermost part of the hopper 46 of the storage part 45 with the same width and extends downwardly, a horizontal passage 52b, which is continuous from the first falling passage 52a and is bent in a direction perpendicular to the first falling passage 52a thereby extending in the horizontal direction, and a second falling passage 52c which is continuous from the horizontal passage 52b and is bent in a direction perpendicular to the horizontal passage 52b, thereby extending downwardly. The second falling passage 52c descends towards a lower surface 51u of the body member 22B and is thus open as the discharge port 51o.

With such a structure, even though the molding sand S stored inside the hopper 46 is flown out from the flow-out ditch 46b and descends into the first falling passage 52a because of its own weight, the discharge passage 52 is able to restrain the molding sand S from advancing without limit inside the horizontal passage 52b that is bent at a right angle after the first falling passage 52a.

The vibrators 53 are fixed to both end-side outer surfaces 51s in the longitudinal direction of the discharge part 51 in the body member 22B, respectively, and input vibration to the discharge passage 52 in a lower part of the hopper 46 of the storage part 45. The vibrators 53 are connected with the later-described controller 91 that controls drive of the vibrators 53 by switching input and interruption of driving current.

Because of this, in the discharge part 51, as the vibrators 53 are driven as appropriate to input vibration, the molding sand S, which descends into the horizontal passage 52b from the flow-out ditch 46b of the hopper 46 through the first falling passage 52a of the discharge passage 52, advances in the horizontal direction because of the input of vibration, and is flown into the second falling passage 52c. Therefore, in the discharge part 51, as the vibrators 53 are vibrated or stopped as appropriate, the molding sand S stored inside the hopper 46 passes through the first falling passage 52a, the horizontal passage 52b, and the second falling passage 52c of the discharge passage 52, and is discharged from the discharge port 51o, which is an end outlet of the second falling passage 52c, while being adjusted to a desired amount.

In the leveling part 54, a step is formed in a location next to one side of the lower surface 51u of the body member 22B, on which the discharge port 51o of the discharge part 51 is open, and the leveling part 54 is structured by including a vertical wall 54v and a lower surface 54u. The step-shaped leveling part 54 extends in the longitudinal direction of the discharge port 51o that is open on the lower surface 51u of the body member 22B. The vertical wall 54v of the leveling part 54 is formed into a shape that is lower than the level of the lower surface 51u in a direction towards the upper surface 12a of the molding table 12, and the lower surface 54u is formed into a shape that extends in a direction away from the discharge port 51o while remaining at the lower side level of the vertical wall 54v and faces the upper surface 12a of the molding table 12. In the embodiment, an example case is explained in which the leveling part 54 is formed integrally with the body member 22B of the recoater 22, but the disclosure is not limited to this. For example, by structuring the leveling part using a single blade that reciprocates in the similar direction as that of the recoater 22, the molding sand S on the upper surface 12a of the molding table 12 may be raked and leveled so that molding sand S is flattened with the constant layer thickness d.

Because of this, as the leveling part 54 moves integrally with the discharge part 51 of the recoater 22, the vertical wall 54v is allowed to scrape excessive molding sand S discharged onto the upper surface 12a of the molding table 12, and the molding sand S in the molding region A is evenly leveled into the layer thickness d that coincides with a distance of separation between the lower surface 54u and the upper surface 12a of the molding table 12.

Then, the controller 91 executes a control program, which is previously stored in a memory 92, and performs integrated control to drive the elevating table device 11, the powder and grain material lamination device 21, and the binder injection device 31 that structure the drive system 10 of the three-dimensional molding device 100, thereby fabricating the molded object P.

Figure 4:
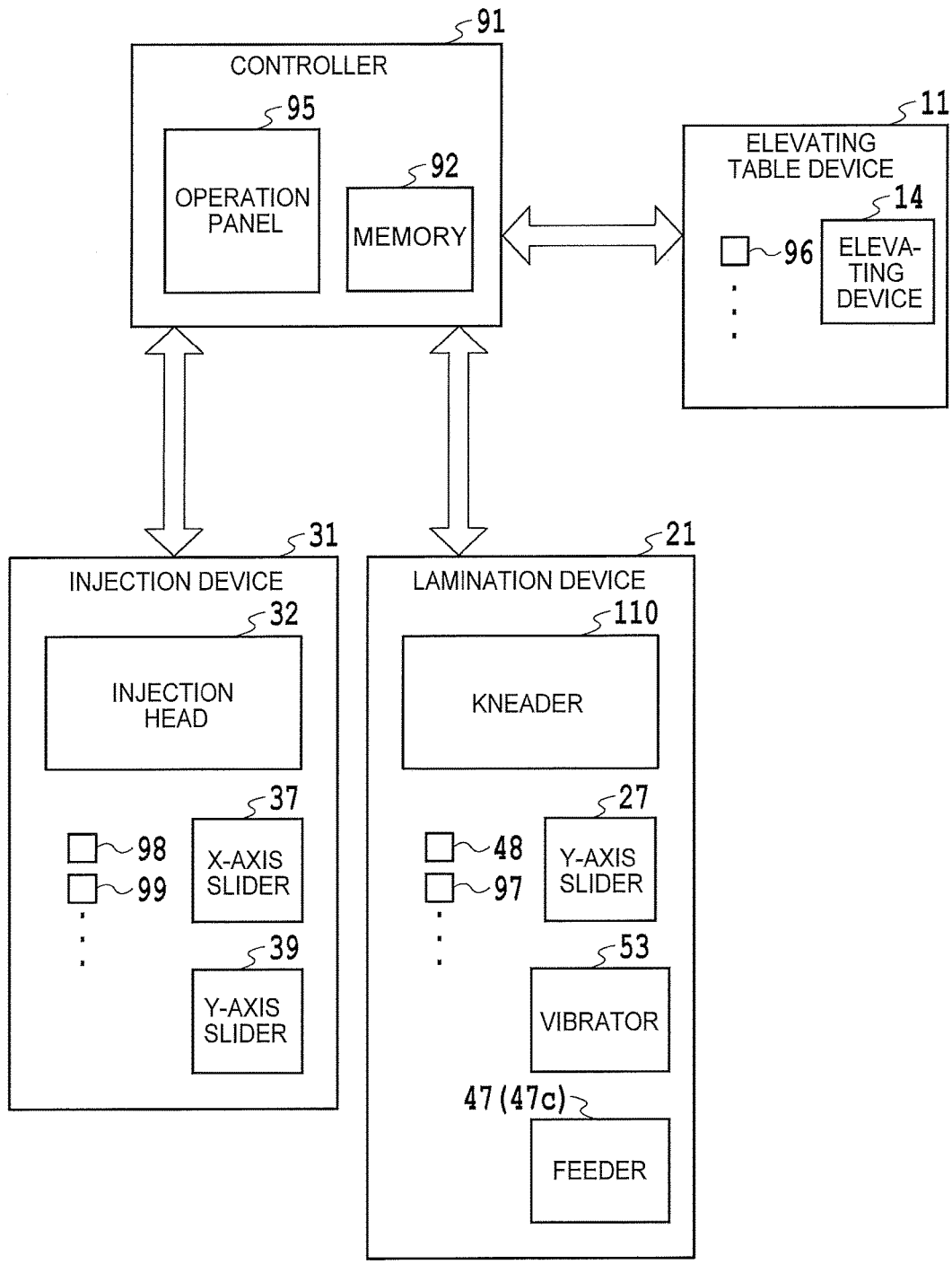
FIG. 4 is a conceptual block diagram of a control system of the first embodiment.

Specifically, as shown in FIG. 4, the controller 91 is provided with an operation panel 95 on which an operator performs various input operations. The controller 91 receives stereoscopic data from a connected computer (not shown) in accordance with an input operation from the operation panel 95, or reads stereoscopic data selected from a set medium (now shown). Then, the controller 91 stores the data inside the memory 92. Based on the stereoscopic data stored in the memory 92, the controller 91 creates transverse-sectional shape data for forming a molded object solidified region Hp (see FIG. 5A and FIG. 5B) for every layer thickness d of the molded object P in the molding sand S in the molding region A on the upper surface 12a of the molding table 12, and stores (sets) the transverse-sectional shape data inside the memory 92. This means that the controller 91 structures a solidified region setting part of the disclosure.

By performing the integrated control of each of the devices 11, 21, 31 of the drive system 10 based on the transverse-sectional shape data for every layer thickness d of the molded object P inside the memory 92, the controller 91 repeats a molding process operation for forming the molded object solidified region Hp inside the molding region A of the molding sand S, thereby molding a desired molded object P. In the embodiment, an example case is explained where stereoscopic data of the molded object P is stored in the memory 92, and the controller 91 creates transverse-sectional shape data of a molded object solidified region Hp for every layer thickness d and stores the data inside the memory 92. However, the disclosure is not limited to this. For example, the controller 91 may receive necessary data such as transverse-sectional shape data and the layer thickness d of stereoscopic data of a previously fabricated molded object P, store it inside the memory 92, and then perform the molding process operation.

In the elevating table device 11, various sensors are installed including a height sensor 96 that detects height of the upper surface 12a of the molding table 12. The various sensors including the height sensor 96 are connected with the controller 91 so as to be able to send out sensor signals.

After a later-described binder injection process performed by the binder injection device 31, the controller 91 sends a drive signal to the elevating device 14 and drives the elevating device 14 in order to lower the molding table 12 by the layer thickness d set inside the memory 92. When the controller 91 recognizes (acquires) that a descent of the molding table 12 by the layer thickness d has completed based on a sensor signal from the height sensor 96 of the elevating table device 11, the controller 91 sends a stop signal to the elevating device 14 to stop the elevating device 14.

In the powder and grain material lamination device 21, the residual quantity sensor 48, and a recoater-Y-axis-position-sensor 97 are installed together with other various sensors. The recoater-Y-axis-position-sensor 97 is an encoder or the like, which detects a position of the recoater-Y-axis-slider 27 on the recoater-Y-axis-rail 26 of the moving mechanism 25. The various sensors including the recoater-Y-axis-position-sensor 97 and the residual quantity sensor 48 are connected with the controller 91 so as to be able to send out sensor signals.

After the molding table 12 of the elevating table device 11 descends by the layer thickness d, the controller 91 causes the recoater-Y-axis-slider 27 to run on the recoater-Y-axis-rail 26 of the moving mechanism 25 at previously-set discharge speed in the discharge direction, and causes the vibrators 53 to vibrate.

Because of this, when the recoater 22 is moved from a home position Hr to an end position beyond the molding region A, the molding sand S is discharged from the discharge port 51o of the discharge part 51 on top of the upper surface 12a of the molding table 12.

When the controller 91 recognizes that the recoater 22 has moved beyond the molding region A on top of the molding table 12 based on a sensor signal from the recoater-Y-axis-position-sensor 97 of the powder and grain material lamination device 21, the controller 91 causes the recoater-Y-axis-slider 27 on the recoater-Y-axis-rail 26 of the moving mechanism 25 to run at previously-set leveling speed in a direction opposite to the discharge direction.

Because of this, when the recoater 22 is returned from the end position to the home position Hr, the molding sand S, which is discharged with a thickness to a certain extent on top of the upper surface 12a of the molding table 12, is scraped by the vertical wall 54v of the leveling part 54, while being evenly leveled and flattened into the layer thickness d, which is a distance of separation between the lower surface 54u and the upper surface 12a of the molding table 12. This means that the controller 91 structures a movement control part.

Then, when the controller 91 recognizes that the height of the molding sand S stored in the hopper 46 is smaller than a previously-set replenishment threshold based on a sensor signal of the residual quantity sensor 48 of the powder and grain material lamination device 21, the controller 91 executes a control operation to drive and rotate the feeder 47 and adjust the height of the molding sand S roughly uniformly by using the spiral plate 47b. After executing the control operation for leveling the molding sand S by using the feeder 47, the controller 91 notifies an operator that the molding sand S needs to be replenished when it is determined that the height of the molding sand S is smaller than the replenishment threshold based on a sensor signal detected by the residual quantity sensor 48. For example, the controller 91 flickers a replenishment lamp (not shown), encouraging an operator to do the replenishing operation.

In the binder injection device 31, a head-Y-axis-position-sensor 98 and a head-X-axis-position-sensor 99 are installed together with other various sensors. The head-Y-axis-position-sensor 98 is an encoder or the like, which detects a position of the head-Y-axis-slider 37 on the head-Y-axis-rail 36 of the moving mechanism 35. The head-X-axis-position-sensor 99 is an encoder or the like, which detects a position of the head-X-axis-slider 39 on the head-X-axis-rail 38 of the moving mechanism 35. The various sensors including the head-Y-axis-position-sensor 98 and the head-X-axis-position-sensor 99 are connected with the controller 91 so as to be able to send out sensor signals.

After the recoater 22, which has discharged and laminated the molding sand S on top of the upper surface 12*a* of the molding table 12, is returned to the home position Hr, the controller 91 causes the head-Y-axis-slider 37 and the head-X-axis-slider 39 of the moving mechanism 35 to run at previously-set injection speed in the X-axis direction and the Y-axis direction, and causes the binder to be injected from the injection holes of the injection head 32. Then, the controller 91 causes the binder to be injected to the molded object solidified region Hp that corresponds to the transverse-sectional shape data of the molded object P in the uppermost layer of the molding sand S laminated on top of the upper surface 12*a* of the molding table 12.

When the controller 91 recognizes, based on sensor signals from the head-Y-axis-position-sensor 98 and the head-X-axis-position-sensor 99, that the injection head 32 has moved to a position beyond the molded object solidified region Hp by an over distance previously set inside the memory 92, the controller 91 causes the head-Y-axis-slider 37 and the head-X-axis-slider 39 to run at previously-set returning speed and return the injection head 32 to a home position Hh.

Because of this, the molded object solidified region Hp in the uppermost layer of the molding sand S, which is discharged and laminated on top of the upper surface 12*a* of the molding table 12, is bonded and solidified, and an injection process of the binder for one layer of the molding sand S with the layer thickness d by the binder injection device 31 is ended.

Then, by repeating the process of discharging and laminating the molding sand S on top of the upper surface 12*a* of the molding table 12 and then bonding and solidifying the molding sand S as stated above, the controller 91 molds a molded object P in which the molded object solidified region Hp of the molding sand S is laminated for every layer thickness d, and ends the series of molding operation process. The molded object P is formed inside the unsolidified molding sand Sd.

Figure 5A:
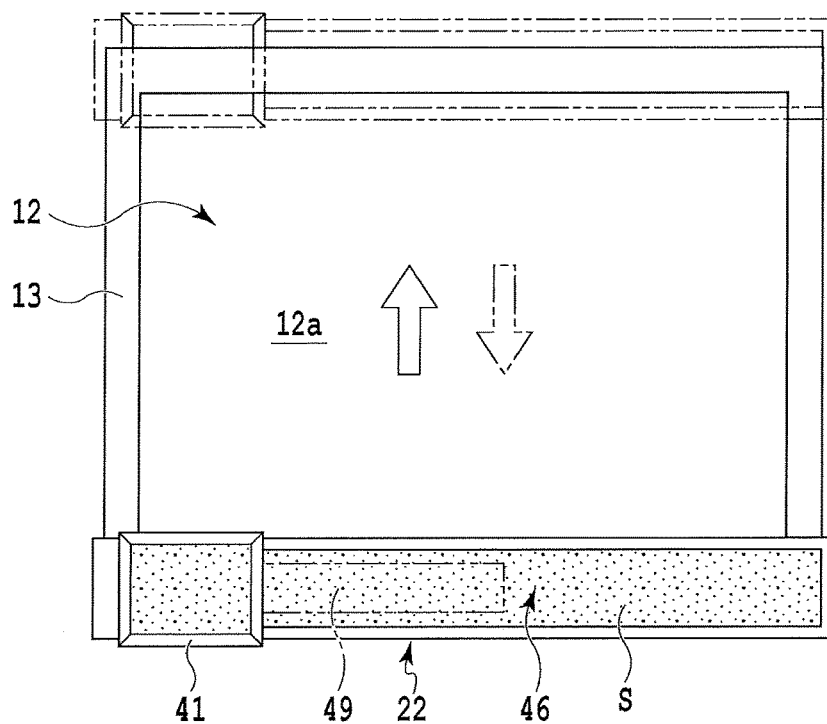
FIG. 5A is a view explaining lamination of a granular material by the recoater of the first embodiment, and a plan view explaining reciprocation of the recoater in a plane direction of a molding table.
Figure 5B:
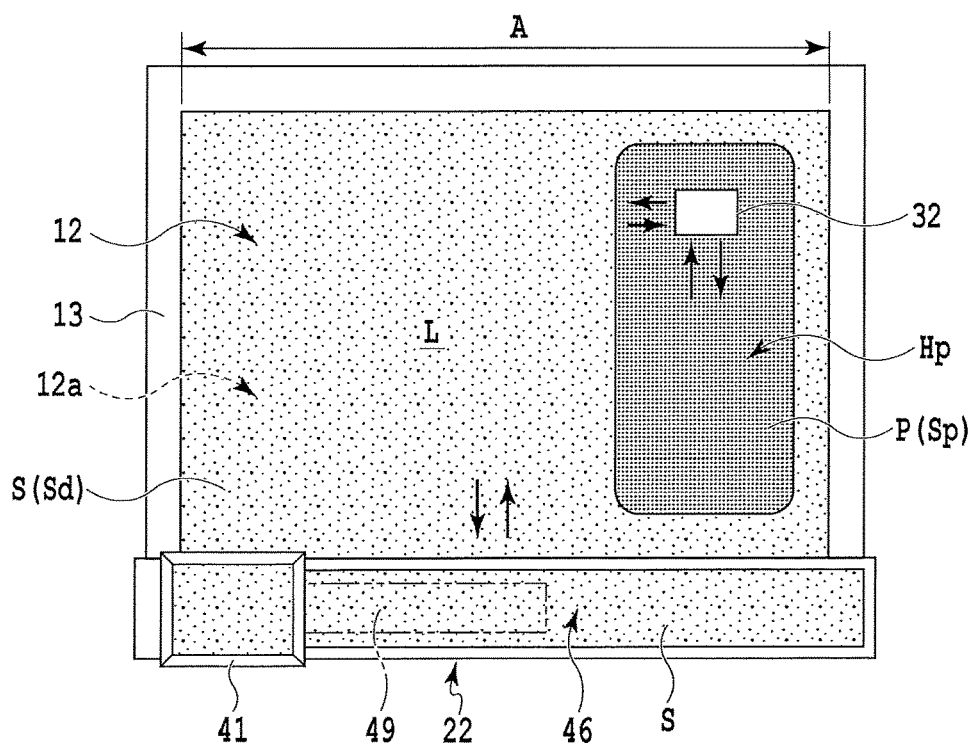
FIG. 5B is a view explaining lamination of the granular material by the recoater of the first embodiment, and a plan view explaining a molding region in which the granular material is laminated by the recoater and a molded object can be molded.

As stated above, the powder and grain material lamination device 21 causes the recoater 22 to reciprocate in the Y-axis direction as shown in FIG. 5A, thereby making it possible to discharge the molding sand S from the recoater 22 on top of the molding table 12 of the elevating table device 11 and laminate the molding sand S with the uniform layer thickness d. Further, as shown in FIG. 5B, the binder injection device 31 causes the injection head 32, which moves in the X-axis direction and the Y-axis direction, to inject the binder to the molded object solidified region Hp within the molding region A of the molding sand S on top of the molding table 12, thereby bonding and solidifying the molded object solidified region Hp. As a result, by repeating the injection and lamination step and the bonding and solidifying step of the molding sand S while lowering the molding table 12 by the layer thickness d, the three-dimensional molding device 100 is able to laminate the solidified molding sand Sp inside unsolidified molding sand Sd and mold a solid-shaped molded object P.

Further, in the recoater 22 according to the embodiment, at least one plug member 49 is provided inside the housing space 46*s* of the hopper 46 of the storage part 45 so that the plug member 49 is detachable from the opening 46*i* side. The plug member 49 is formed into an inverted triangle column shape in a vertical section, which roughly matches a lower part of the housing space 46*s* of the hopper 46. The plug member 49 is fabricated so as to be fitted into the housing space 46*s* of the hopper 46 below the spiral plate 47*b* of the feeder 47 and close a part of the lowermost flow-out ditch (opening) 46*b* of the housing space 46*s*.

Because of this, as the plug member 49 is fitted and set into the hopper 46, it is possible to close the flow-out ditch 46*b* that allows the molding sand S stored inside the housing space 46*s* to flow out without interfering an operation of the feeder 47. Thus, the plug member 49 is able to narrow down a range of discharging the molding sand S from the discharge port 51*o* onto the upper surface 12*a* of the molding table 12 (limit a discharge range) to, for example, an extent that exceeds the molded object solidified region Hp inside the molding region A on the upper surface 12*a* of the molding table 12.

Figure 6:
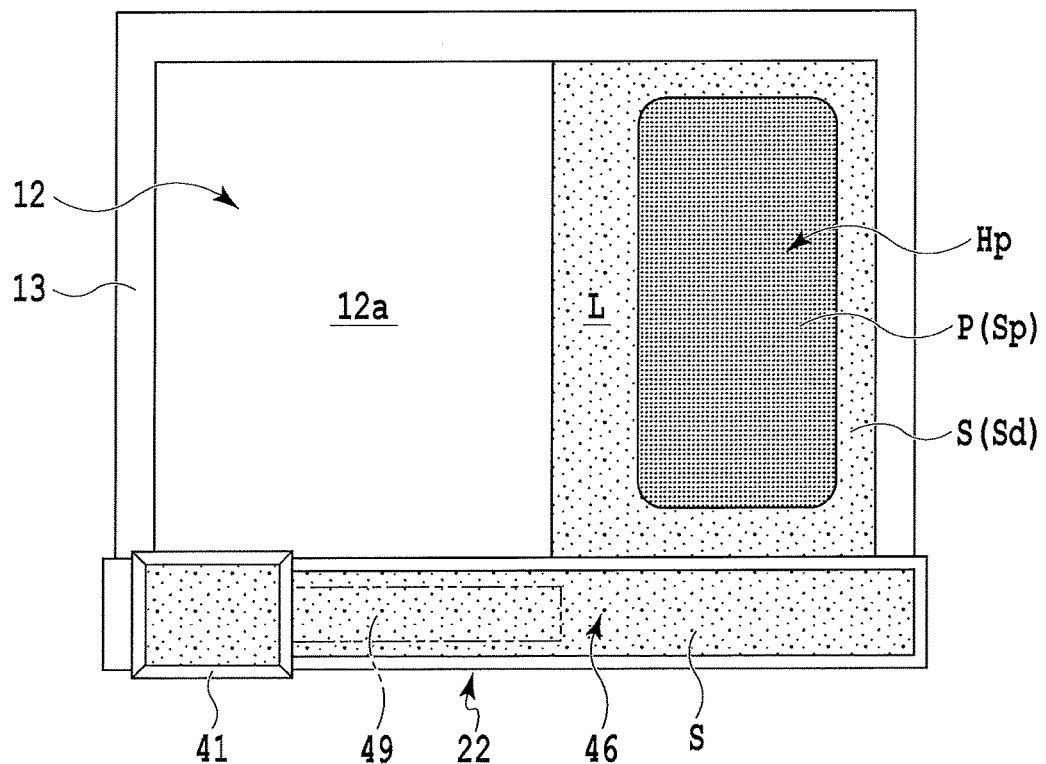
FIG. 6 is a plan view explaining lamination of the granular material by the recoater when a molded object is molded with a plug member set to the recoater.

As stated above, in the three-dimensional molding device 100 according to the embodiment, by setting the plug member 49 inside the hopper 46 of the recoater 22, it is possible to limit the discharge range of the molding sand S onto the upper surface 12*a* of the molding table 12 to around the molded object solidified region Hp as shown in FIG. 6. Therefore, a discharge amount of the molding sand S, which is discharged and laminated on the upper surface 12*a* of the molding table 12, can be adjusted to an appropriate amount in accordance with the size of the molded object P. Therefore, compared to a case where the molding sand S is discharged and laminated on the entire surface of the molding region A on top of the upper surface 12*a* the molding table 12, it is possible to greatly reduce a recovery amount of the unsolidified molding sand Sd.

As a result, it is possible to realize a molding operation using an appropriate amount of the molding sand S in accordance with the size of the molded object P. Thus, it is possible to provide the three-dimensional molding device, with which a workload is reduced to lamination and solidification in accordance with the size of the molded object, and the molded object is molded in a period of time corresponding to the size of the molded object.

Figure 7:
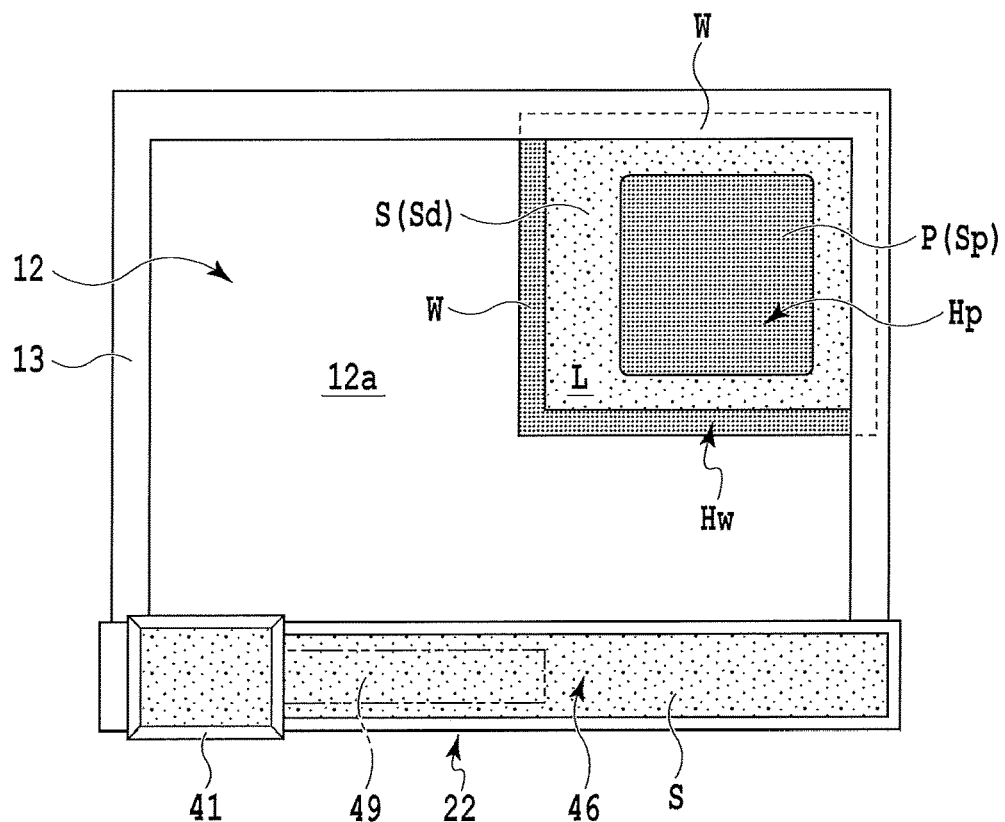
FIG. 7 is a view explaining the second embodiment of a three-dimensional molding device, and is a plan view explaining a main structure of the three-dimensional molding device.
Figure 8:
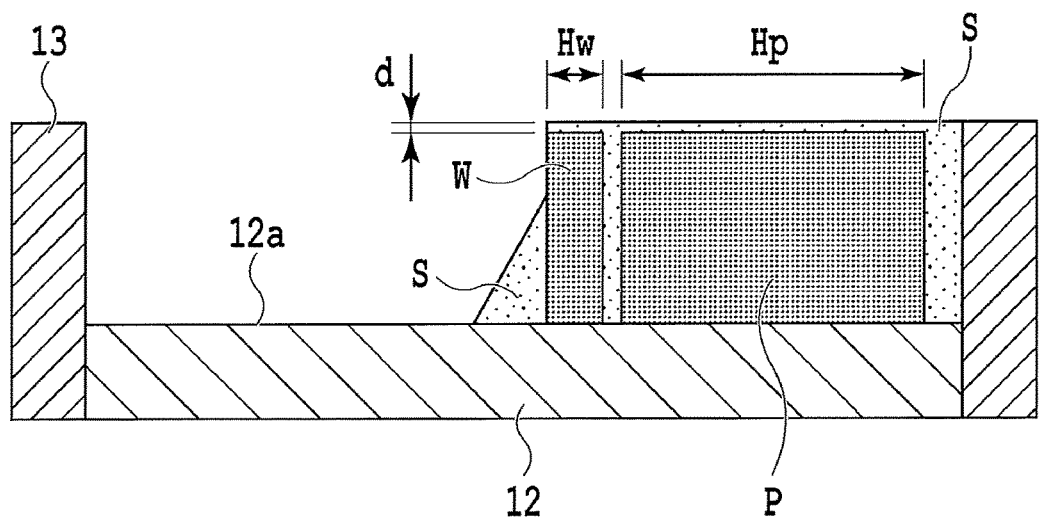
FIG. 8 is a schematic vertical sectional view of structures of a molded object and a wall-shaped object laminated on an upper surface of a molding table according to the second embodiment.
Figure 9:
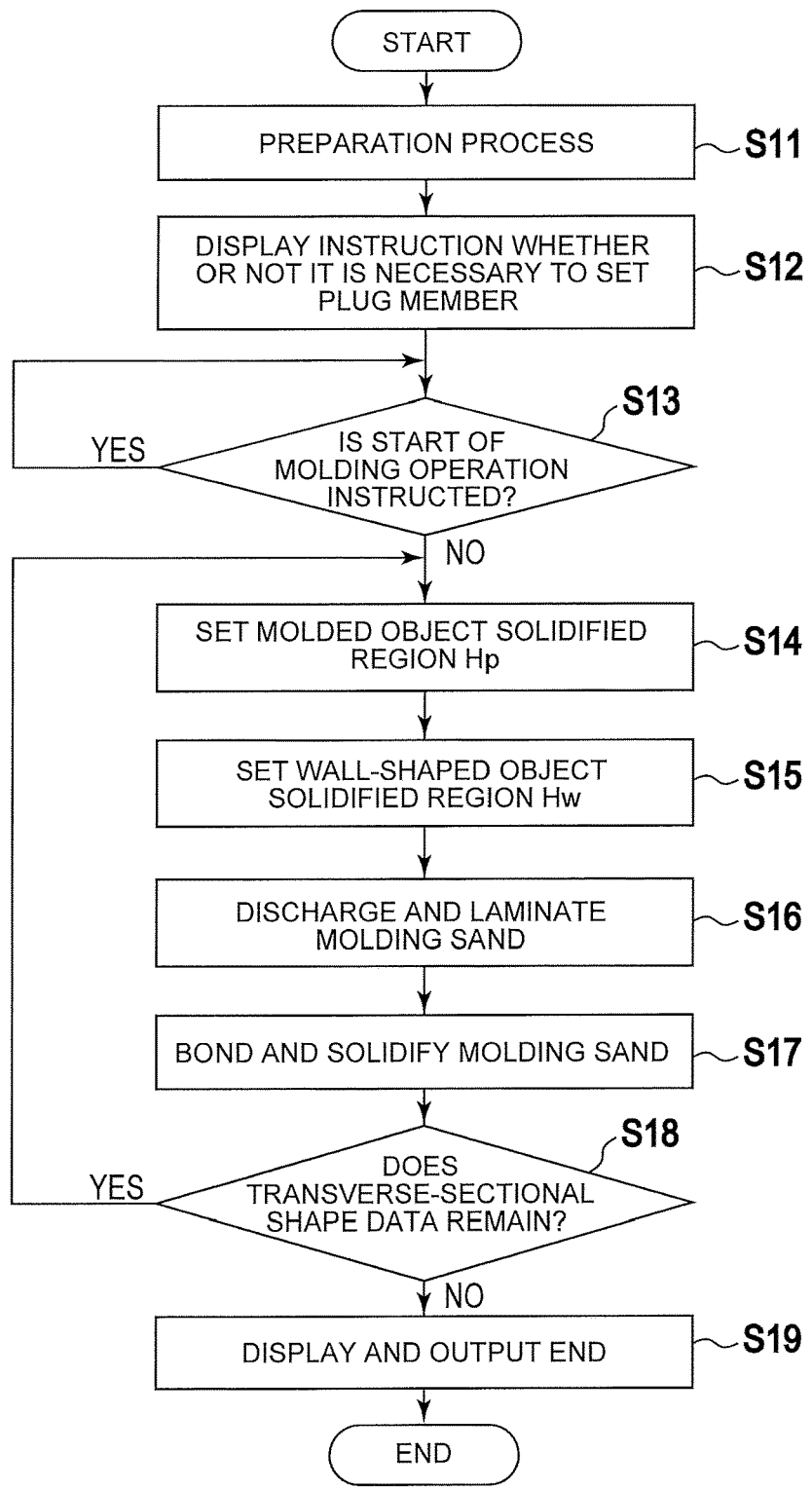
FIG. 9 is a view of an embodiment of a three-dimensional molding method, in which the second embodiment of the three-dimensional molding device is used, and is a flowchart explaining a molding process method in the three-dimensional molding method.

Next, FIG. 7 and FIG. 8 are views explaining the second embodiment of the three-dimensional molding device according to the disclosure, and FIG. 9 is a view explaining an embodiment according to a three-dimensional molding method of the disclosure in which the three-dimensional molding device is used. Here, since this embodiment is structured almost similarly to the foregoing embodiment, the same drawings are used, and the same reference numerals are used for similar constituents to explain features.

In FIG. 1 and FIG. 4, a controller 91 of a three-dimensional molding device 100 according to the embodiment creates transverse-sectional shape data of a wall-shaped object solidified region Hw for each layer based on received stereoscopic data of a molded object P, and stores (sets) the data inside a memory 92. In the wall-shaped object solidified region Hw, a wall-shaped object W is molded outside a molded object solidified region Hp of the molded object P. The wall-shaped object W is laminated together with the molded object P to have a layer thickness d so as to store molding sand S that is laminated in a non-solidified state next to the molded object P without being bonded and solidified by a binder.

In a case where a position in which the wall-shaped object W is formed in the molding region A on an upper surface 12*a* of a molding table 12 is more proximate to a frame member 13 than a previously-set proximity threshold, the controller 91 forms the wall-shaped object W except the proximate part so that the wall-shaped object W is continuous with the frame member 13. This means that, since the frame member 13 functions as the wall-shaped object W, a molding process of the wall-shaped object W is omitted in the proximate part shown by a broken line in FIG. 7.

When the controller 91 recognizes, based on a sensor signal from a recoater-Y-axis-position-sensor 97 of a powder and grain material lamination device 21, that a recoater 22 has moved in a Y-axis direction on the upper surface 12a of the molding table 12 to a position beyond the wall-shaped object solidified region Hw by an over distance previously set inside the memory 92, the controller 91 causes the recoater-Y-axis-slider 27 to run at leveling speed in a direction opposite to a discharge direction.

Then, the controller 91 executes a control program in the memory 92, and carries out the three-dimensional molding method shown in a flowchart in FIG. 9. Thus, the molded object P is molded.

To be more specific, first of all, the controller 91 carries out a preparation process (step S11), such as storing stereoscopic data and a layer thickness d of the molded object P inside the memory 92, together with transverse-sectional shape data of each layer, which is obtained by adding the wall-shaped object solidified region Hw to the molded object solidified region Hp laminated for every layer thickness d.

Next, the controller 91 displays and outputs on an operation panel 95 if it is necessary to set a plug member 49, which does not interfere discharge of the molding sand S, in a range up to an outermost part of the molded object solidified region Hp or the wall-shaped object solidified region Hw in the molding region A of the upper surface 12a of the molding table 12 (the molding sand S can be discharged to the outermost parts), and the controller 91 also displays and outputs an instruction regarding a type of the plug member 49 (step S12).

Here, in a case where the smallest interval from the outei nost part of the molded object solidified region Hp or the wall-shaped object solidified region Hw to a long side 12x of the upper surface 12a of the molding table 12 is larger than a necessity threshold that is previously set inside the memory 92, the controller 91 instructs to set a type of the plug member 49 corresponding to the interval. In the embodiment, a molding operation process for forming the wall-shaped object W is explained.

Thereafter, the controller 91 repeatedly confirms if an operator has input an instruction to start the molding operation, which is carried out after works are done in accordance with instructions displayed on the operation panel 95, such as setting the plug member 49 (step S13).

In step S13, when the controller 91 confirms that the molding operation start instruction is input by an operator, the controller 91 reads transverse-sectional shape data of the lowermost layer of the unprocessed molded object P inside the memory 92, and sets the data as the molded object solidified region Hp in the molding region A on the upper surface 12a of the molding table 12 (step S14).

Next, the controller 91 reads transverse-sectional shape data of the unprocessed lowermost layer of the wall-shaped object W in the memory 92, and sets it as the wall-shaped object solidified region Hw in the molding region A on the upper surface 12a of the molding table 12 (step S15).

Next, the controller 91 causes the recoater 22 of the powder and grain material lamination device 21 to run from the home position Hr in the Y-axis direction of the molding region A on the molding table 12, and then causes the recoater 22 to run in the opposite direction after exceeding the wall-shaped object solidified region Hw by the over distance stored in the memory 92 so that the recoater 22 returns to the home position Hr. Thus, the discharging and laminating operations of the molding sand S is carried out (step S16). In this case, the controller 91 activates the vibrators 53 when the recoater 22 starts running from the home position Hr, thereby allowing the molding sand S to be discharged from the discharge port 51o of the discharge part 51 onto the upper surface 12a of the molding table 12. Thereafter, while the recoater 22 is running to return to the home position Hr, the controller 91 causes the vertical wall 54v of the leveling part 54 to flatten the molding sand S evenly with a uniform layer thickness d, which is the distance of separation from the lower surface 54u, while causing the vertical wall 54v to scrape the molding sand S on the upper surface 12a of the molding table 12.

Next, while allowing the injection head 32 of the binder injection device 31 to run from the home position Hh in the X-axis direction and the Y-axis direction of the molding region A on the upper surface 12a of the molding table 12, the controller 91 causes a binder to be injected from the injection head 32, thereby performing the bonding and solidifying operation of the molding sand S for the molded object solidified region Hp and the wall-shaped object solidified region Hw (step S17). In this case, the controller 91 causes the injection head 32 to start running from the home position Hh and performs the binder injecting process to non-processed lowermost layers of the molded object solidified region Hp and the wall-shaped object solidified region Hw inside the memory 92. After the binder injecting process ends, the controller 91 causes the injection head 32 to run in the opposite direction to return to the home position Hh.

Thereafter, the controller 91 confirms whether or not transverse-sectional shape data of non-processed molded object solidified region Hp and the wall-shaped object solidified region Hw remains in the memory 92 (step S18). When the data remains, the process returns to step S14 and similar control process is repeated. When the data does not remain and the molding process of stereoscopic data of the molded object P is completed, the completion is displayed and output on the operation panel 95 (step S19), and the control process ends.

Because of this, the plug member 49 limits a range of discharging the molding sand S onto the upper surface 12a of the molding table 12 from the discharge port 51o of the recoater 22 to an extent of exceeding the wall-shaped object solidified region Hw outside the molded object solidified region Hp. At the same time, the controller 91 causes the recoater 22 to reciprocate within a range to the extent of exceeding the wall-shaped object solidified region Hw outside the molded object solidified region Hp. Therefore, it is possible to greatly reduce a discharge amount of the molding sand S from the discharge port 51o.

In this case, the controller 91 form the wall-shaped object solidified region Hw in addition to the molded object solidified region Hp, thereby making it possible to store the molding sand S in an unsolidified state between the molded object P and the wall-shaped object W outside the molded object P. Therefore, without a need of an inclined surface, or so-called a slope shape, for maintaining the shape of the molding sand S in the molded object solidified region Hp, it is possible that the wall-shaped object W is able to effectively avoid collapse of the molding sand S in the molded object solidified region Hp, and it is possible to greatly reduce a discharge amount of the molding sand S by setting a large discharge limit range using the plug member 49 while reducing a reciprocating range of the recoater 22.

As stated above, in the three-dimensional molding device 100 according to the embodiment and the three-dimensional molding method using the three-dimensional molding device 100, in addition to the effects of the foregoing first embodiment, a discharge amount of the molding sand S from the recoater 22 of the powder and grain material lamination device 21 is reduced further, thereby further reducing a recovery amount of the molding sand Sd that does not need to be solidified.

Further, by simply adding the wall-shaped object solidified region Hw in addition to the molded object solidified region Hp, it is possible to carry out the molding operation without a need of work that requires consideration of an inclined angle of the slope for avoiding collapse of the molding sand S outside the molded object P.

As a result, it is possible to provide the three-dimensional molding device and the three-dimensional molding method, by which not only the molding operation is realized using a more appropriate amount of the molding sand S in accordance with the size of the molded object P, but also the molding operation is simplified, thereby further reducing a workload.

Figure 10:
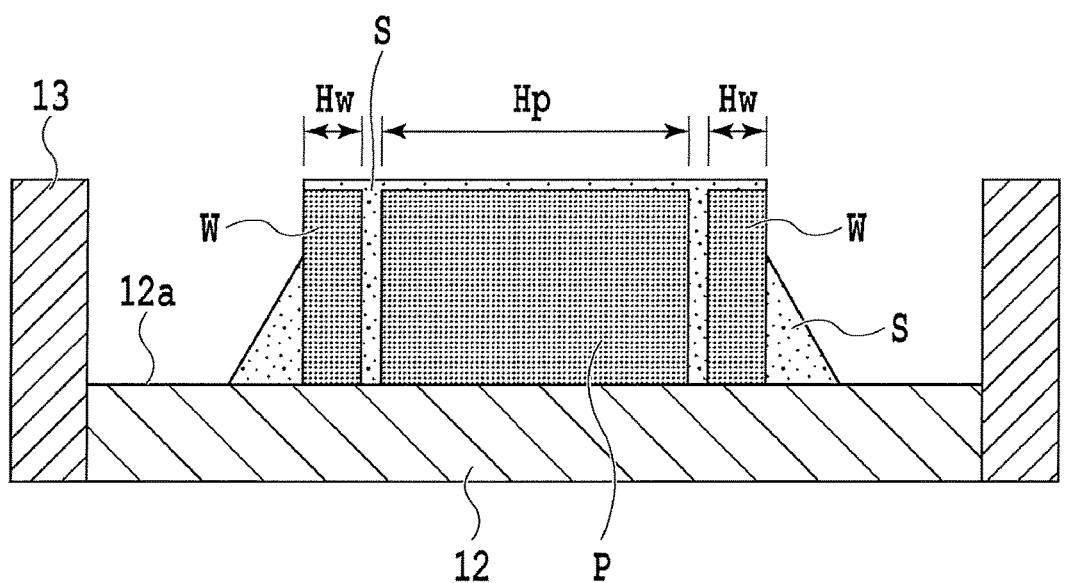
FIG. 10 is a view explaining another form of the second embodiment of the three-dimensional molding device and the embodiment of the three-dimensional molding method, and is a schematic vertical sectional view of structures of a molded object and a wall-shaped object laminated on the upper surface of the molding table.

Here, with regard to other forms of the embodiment, the disclosure is not limited to the example case explained where a discharge range (opening) of the molding sand S is partially closed by one plug member 49 that is set at one location on one side of the flow-out ditch 46b of the hopper 46 communicating with the discharge port 51o of the recoater 22. The plug member may be set at a plurality of locations in the longitudinal direction of the flow-out ditch 46b in order to close a part of the opening. For example, as shown in FIG. 10, when a molded object P is formed near the center on top of the upper surface 12a of the molding table 12, and a wall-shaped object W is formed on both sides of the molded object P, a plug member may be set on both sides of the flow-out ditch 46b of the hopper 46 of the recoater 22 so as to partially close the sides close to the frame member 13.

A plurality of types of plug members having different lengths and so on may be prepared, selected, and used as combinations as appropriate. For example, short-length plug members may be set while their end portions being connected with each other to be continuous, and a discharge range of the molding sand S from the discharge port 51o of the recoater 22 may be limited as appropriate with margin.

Although the embodiments of the disclosure have been disclosed, it is obvious to a person skilled in the art that changes may be added without departing from the range of the disclosure. It is intended that all of such modifications and equivalents are included in the following claims.

What is claimed is:

1. A three-dimensional molding device, which forms a molded object by solidifying and laminating a partial region of a granular material that is superimposed in layer on an upper surface of a molding table, the three-dimensional molding device comprising:
    a recoater configured to discharge the granular material from a discharge port having an elongated shape onto the upper surface of the molding table such that the granular material is superimposed in layer;
    a moving mechanism configured to cause the recoater to reciprocate in a plane direction parallel to the upper surface of the molding table, the recoater reciprocating in a direction intersecting a longitudinal direction of the discharge port;
    a solidification device configured to solidify a partial region of the granular material in a plane direction of the upper surface of the molding table, the granular material being superimposed in layer on the upper surface of molding table; and
    at least one plug member configured to close a part of an opening in at least one location in the longitudinal direction of the discharge port of the recoater and limit a discharge range of the granular material, the at least one plug member being removable from the recoater, wherein
    the recoater includes a hopper configured to store the granular material, a discharge passage for the granular material that continues from the hopper to the discharge port, and a vibrator configured to input vibration to the discharge passage, and
    the discharge passage includes a passage configured to advance the granular material in a horizontal direction, in a middle of a passage configured to descend the granular material from the hopper to the discharge port.

2. The three-dimensional molding device according to claim 1, further comprising:
    a solidified region setting part that sets a solidifying region in each layer of the granular material, wherein
    the solidified region setting part sets a solidifying region of the molded object and a solidifying region of a wall-shaped object, which is located outside the solidifying region of the molded object and stores the granular material laminated in a non-solidified state next to the molded object.

3. The three-dimensional molding device according to claim 2, further comprising:
    a movement control part configured to control the moving mechanism, wherein
    the movement control part is configured to move the recoater such that the discharge port reciprocates within a range exceeding the solidifying region of the wall-shaped object by a predetermined distance.

4. The three-dimensional molding device according to claim 1, wherein two or more of the plug members are provided so as to be combined together, are each set in the hopper, and are each formed so as to narrow the discharge port of the recoater only in the longitudinal direction.

5. The three-dimensional molding device according to claim 4, wherein
    the plug members are provided in such a manner as to include a plurality of kinds of plug members having different lengths in the longitudinal direction of the discharge port.

6. A three-dimensional molding method for forming the molded object using the three-dimensional molding device according to claim 1, the three-dimensional molding method comprising:
    forming a molded object solidified region forming the molded object, and a wall-shaped object solidified region forming a wall-shaped object that is molded outside the molded object solidified region and stores the granular material laminated in a non-solidified state,
    by using the solidification device, in the granular material that is formed into a layer with a constant thickness on the upper surface of the molding table.

7. The three-dimensional molding method according to claim 6,
    further comprising:
    setting one or more of the plug members on a discharge port side of the recoater, the one or more of the plug members limiting discharge of the granular material an extent of exceeding the wall-shaped object solidified region outside the molded object solidified region.

* * * * *